United States Patent [19]

Saito et al.

[11] Patent Number: 4,647,398
[45] Date of Patent: Mar. 3, 1987

[54] LIQUID-CRYSTALLINE CARBONIC ACID ESTERS AND LIQUID CRYSTAL COMPOSITIONS CONTAINING SAME

[75] Inventors: Shinichi Saito; Hiromichi Inoue; Kanetsugu Terashima; Takashi Inukai, all of Yokohama; Kenji Furukawa, Yokosuka, all of Japan

[73] Assignee: Chisso Corporation, Osaka, Japan

[21] Appl. No.: 692,164

[22] Filed: Jan. 17, 1985

[30] Foreign Application Priority Data

Feb. 3, 1984 [JP] Japan .................................. 59-18086
Sep. 4, 1984 [JP] Japan ................................. 59-185148

[51] Int. Cl.$^4$ ...................... C09K 19/12; C07C 69/96; G02F 1/13
[52] U.S. Cl. ........................ 252/299.65; 252/299.1; 252/299.66; 252/299.67; 252/299.01; 558/270; 558/273; 558/271; 558/268; 350/350 S
[58] Field of Search ...................... 252/299.63, 299.64, 252/299.65, 299.66, 299.67, 299.6, 299.1; 260/463; 350/350 S; 558/270, 273

[56] References Cited

U.S. PATENT DOCUMENTS

| | | | |
|---|---|---|---|
| 3,772,209 | 11/1973 | Batesky | 252/299.67 |
| 3,772,210 | 11/1973 | Lodolini | 252/299.67 |
| 3,790,498 | 2/1974 | Katagiri et al. | 252/299.67 |
| 3,951,846 | 4/1976 | Gavrilovic | 252/299.65 |
| 4,029,594 | 6/1977 | Gaurilovic et al. | 252/299.65 |
| 4,576,732 | 3/1986 | Isogai et al. | 252/299.65 |
| 4,589,996 | 5/1986 | Inoue et al. | 252/299.65 |

FOREIGN PATENT DOCUMENTS

| | | | |
|---|---|---|---|
| 153826 | 9/1985 | European Pat. Off. | 252/299.65 |
| 49-37351 | 10/1974 | Japan | 252/299.67 |
| 49-37352 | 10/1974 | Japan | 252/299.67 |

OTHER PUBLICATIONS

Flussige Kristalle in Tabellen, Demus et al., Ed., 1976, pp. 73-75.
Gray et al., Mol. Cryst. Liq. Cryst., 1976, vol. 37, pp. 157-188.
Liq. Cryst. & Ordered Fluids, Goodby et al., vol. 4, 1984, pp. 1-32, from Proceedings of ACS Symposium in U.S. 1982.

Primary Examiner—Teddy S. Gron
Assistant Examiner—Jack Thomas
Attorney, Agent, or Firm—Wenderoth, Lind & Ponack

[57] ABSTRACT

Novel chiral smectic ester compounds suitable for a display mode utilizing ferroelectric liquid crystals, and liquid crystal compositions containing the same are provided, which compounds are expressed by the formula

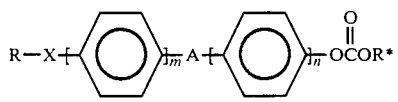

wherein R represents an alkyl group of 1 to 18 carbon atoms; R* represents an optically active alkyl group of 4 to 18 carbon atoms; X represents either one of a single bond, —O—

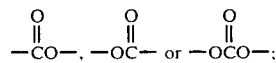

A represents

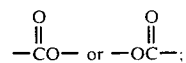

and m and n each is 1 or 2.

5 Claims, No Drawings

LIQUID-CRYSTALLINE CARBONIC ACID ESTERS AND LIQUID CRYSTAL COMPOSITIONS CONTAINING SAME

BACKGROUND OF THE INVENTION

1. Field of the Invention

This invention relates to novel liquid-crystalline substances and liquid crystal compositions containing the same, and more particularly it relates to chiral liquid-crystalline substances and chiral liquid crystal compositions containing the same.

2. Description of the Prior Art

As liquid crystal display elements, those of TN (twisted nematic) type display mode have currently been most broadly employed, but they are inferior to luminescent type display elements (electroluminescence, plasma display, etc.) in the aspect of response rate. Various attempts to improve the response rate have been made, but nevertheless it does not appear that a possibility of improvement to a large extent has been found. Thus, extensive research has been made on liquid crystal display devices in place of TN type display elements, based on another principle, and among these there is a display mode utilizing ferroelectric liquid crystals (N. A. Clark et al; Applied Phys. lett., 36, 899 (1980)). This mode utilizes chiral smectic C phase (hereinafter abbreviated to Sc* phase) or chiral smectic H phase (hereinafter abbreviated to SH* phase), and substances having these phases in the vicinity of room temperature have been desired as suitable ones to this mode. The present inventors have previously found certain chiral smectic compounds suitable to such an object and have applied for patents (e.g. Japanese patent application Nos. Sho 58-640/1983, Sho 58-78,594/1983, Sho 58-106,100/1983, Sho 59-18,086/1984, etc.). Applicants have further searched for various liquid crystal substances having an optically active group therein in order to find superior compounds suitable to this display mode, and have found the novel compounds of the present invention.

SUMMARY OF THE INVENTION

The present invention resides in a compound expressed by the formula

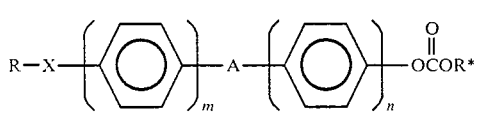
(I)

wherein R represents an alkyl group of 1 to 18 carbon atoms; R* represents an optically active alkyl group of 4 to 18 carbon atoms; X represents either one of a single bond, —O—,

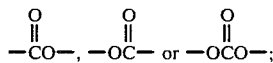

A represents

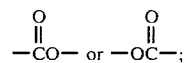

and m and n each is 1 or 2, and a liquid crystal composition containing the same.

DETAILED DESCRIPTION OF THE PREFERRED EMBODIMENTS

Among the above compounds of the formula (I), representative examples of compounds of the formula (I) wherein A represents

i.e. those expressed by the formula

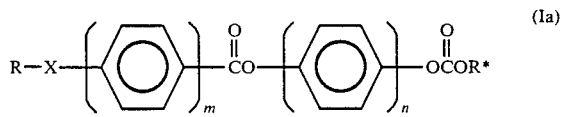
(Ia)

have phase transition points shown in Table 1 listed below.

Further, representative examples of compounds of the formula (I) wherein A represents

i.e. those expressed by the formula

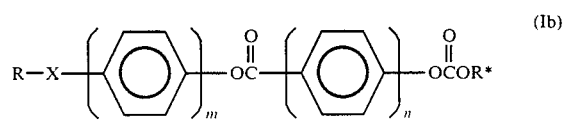
(Ib)

have phase transition points shown in Table 2 listed below.

TABLE 1

| | (Compounds of formula (Ia)) | | | | | | | | | |
|---|---|---|---|---|---|---|---|---|---|---|
| Compd. | In formula (Ia) | | | Phase transition point (°C.) | | | | | | |
| No. | R | m | n | X | C | $S_B$ | $S_C{}^*$ | $S_A$ | ch | I | Note |
| 1 | $C_8H_{17}$ | 1 | 1 | Single bond | • 45.6 | — | — | — | — | • | |
| 2 | $C_8H_{17}$ | 1 | 1 | —O— | • 65.4 | — | — | (• 41.1) | • 58.8 | • | |
| 3 | $C_7H_{15}$ | 1 | 1 | —COO— | • 49.0 | — | — | (• 25.4) | • 58.2 | • | Ex. 3 |
| 4 | $C_8H_{17}$ | 1 | 1 | —OCO— | • 41.7 | — | — | — | — | • | |
| 5 | $C_8H_{17}$ | 1 | 1 | —OCOO— | • 38.8 | — | — | — | • 41.6 | • | |
| 6 | $C_4H_9$ | 1 | 2 | Single bond | • 76.0 | • 82.7 | — | — | • 172.6 | • | |
| 7 | $C_5H_{11}$ | 1 | 2 | Single bond | • 78.5 | • 80.0 | • 87.5 | — | • 174.8 | • | |
| 8 | $C_7H_{15}$ | 1 | 2 | Single bond | • 70.1 | • 80.7 | • 108.2 | — | • 165.6 | • | |

TABLE 1-continued (Compounds of formula (Ia))

| Compd. No. | In formula (Ia) R | m | n | X | Phase transition point (°C.) C | | $S_B$ | $S_C^*$ | $S_A$ | ch | I | Note |
|---|---|---|---|---|---|---|---|---|---|---|---|---|
| 9 | $C_8H_{17}$ | 1 | 2 | Single bond | • 76.5 | | • 81.0 | • 115.1 | — | • 158.2 | • | |
| 10 | $C_{10}H_{21}$ | 1 | 2 | Single bond | • 68.0 | | • 92.6 | • 123.0 | — | • 152.5 | • | |
| 11 | $C_4H_9$ | 1 | 2 | —O— | • 105.0 | | — | — | — | • 207.3 | • | |
| 12 | $C_5H_{11}$ | 1 | 2 | —O— | • 79.5 | | (• 75.0) | • 96.7 | — | • 195.3 | • | |
| 13 | $C_6H_{13}$ | 1 | 2 | —O— | • 83.0 | | (• 67.3) | • 110.1 | — | • 191.5 | • | |
| 14 | $C_7H_{15}$ | 1 | 2 | —O— | • 75.0 | | (• 60.8) | • 122.2 | — | • 184.7 | • | |
| 15 | $C_8H_{17}$ | 1 | 2 | —O— | • 62.2 | | (• 55.0) | • 131.8 | — | • 182.4 | • | |
| 16 | $C_{11}H_{23}$ | 1 | 2 | —O— | • 87.4 | | (• 83.5) | • 144.4 | — | • 168.5 | • | |
| 17 | $C_{16}H_{33}$ | 1 | 2 | —O— | • 69.2 | | • 90.3 | • 135.8 | — | • 146.2 | • | |
| 18 | $C_7H_{15}$ | 1 | 2 | —COO— | • 102.8 | | (• 88.9) | • 144.1 | — | • 190.2 | • | |
| 19 | $C_8H_{17}$ | 1 | 2 | —OCO— | • 87.2 | | — | • 130.9 | • 137.1 | • 146.3 | • | |
| 20 | $C_8H_{17}$ | 1 | 2 | —OCOO— | • 64.4 | | (• 55.2) | • 131.6 | — | • 182.1 | • | Ex. 1 |
| 21 | $C_7H_{15}$ | 2 | 1 | Single bond | • 88.8 | | • 105.0 | — | • 160.7 | • 163.8 | • | |
| 22 | $C_8H_{17}$ | 2 | 1 | Single bond | • 78.3 | | — | — | • 150.2 | • 165.2 | • | Ex. 2 |
| 23 | $C_6H_{13}$ | 2 | 1 | —O— | • 118.0 | | — | — | • 186.0 | • 198.2 | • | |
| 24 | $C_8H_{17}$ | 2 | 1 | —O— | • 104.6 | | — | — | • 182.5 | — | • | |

All R*s in the formula (I) represent 2-methylbutyl group.

TABLE 2

(Compounds of formula (Ib))

| Compd. No. | In formula (Ib) R | m | n | X | Phase transition point (°C.) C | SB | Sc* | SA | Ch | I | Note |
|---|---|---|---|---|---|---|---|---|---|---|---|
| 25 | $C_7H_{15}$ | 2 | 1 | Single bond | • 55.8 | • 105.2 | — | — | • 154.7 | • | |
| 26 | $C_6H_{13}O$ | " | " | Single bond | • 99.7 | — | • 125.1 | — | • 185.0 | • | |
| 27 | $C_8H_{17}O$ | " | " | Single bond | • 104.0 | — | • 135.9 | — | • 173.8 | • | |
| 28 | $C_9H_{19}O$ | " | " | Single bond | • 102.8 | — | • 139.8 | — | • 170.4 | • | Ex. 4 |
| 29 | $C_{10}H_{21}O$ | " | " | Single bond | • 105.6 | — | • 142.9 | — | • 168.8 | • | |
| 30 | $C_6H_{13}$ | 1 | 2 | Single bond | • 66.5 | — | • 122.9 | • 138.2 | • 165.6 | • | |
| 31 | $C_7H_{15}$ | " | " | Single bond | • 76.8 | — | • 125.8 | • 142.8 | • 165.4 | • | |
| 32 | $C_8H_{17}$ | " | " | Single bond | • 86.0 | — | • 121.8 | • 143.0 | • 159.0 | • | |
| 33 | $C_7H_{15}O$ | " | " | Single bond | • 90.8 | — | • 146.3 | — | • 184.0 | • | |
| 34 | $C_8H_{17}O$ | " | " | Single bond | • 88.0 | — | • 149.1 | — | • 180.0 | • | |
| 35 | $C_9H_{19}O$ | " | " | Single bond | • 82.1 | — | • 149.4 | — | • 175.0 | • | Ex. 5 |

All R*s represent 2-methylbutyl group.

In the above Tables 1 and 2, C represents crystalline phase; SA, smectic A phase; SB, smectic B phase; Ch, cholesteric phase; and I, isotropic liquid phase. Further, in the column of the phase transition points, the symbol · representing phases shows that the phase is exhibited there, and the numeral figure on the right side thereof shows a transition point from the phase to a phase on the right side thereof. Further, the parenthesis shows that the phase is monotropic.

Compounds of the formula (I) wherein m=1 and n=2 exhibit a cholesteric phase (hereinafter abbreviated to Ch phase) in the range of temperatures somewhat lower than that of the isotropic liquid phase, and most of these exhibit Sc* phase in the range of temperatures lower than those of this phase and are most preferable. Further, compounds of the formula (I) wherein m=1 or 2, n=1 and A represents OCO, by themselves exhibit no Sc* phase, but exhibit SA phase; hence it is presumed that the compounds have potentially Sc* phase below the temperature range of SA phase. Thus, when the compounds of the formula (I) are added as a component, it is possible to constitute various liquid crystal compositions such as those exhibiting Sc* phase, alone, those exhibiting SA phase, alone, those exhibiting both Sc* phase and SA phase, etc. Further it is also possible to broaden the temperature range of Sc* phase.

R* of the formula (I) is derived from optically active alcohols, as described later, and as currently commercially easily available raw material alcohols, optically active 2-methylbutanol has been most often used. Next thereto, optically active 2-octanol, 2-pentanol, 2-butanol, etc. are used.

Thus, commercially most easily available R*s are first 2-methylbutyl group, and next, 1-methylheptyl group, 1-methylbutyl group, 1-methylpropyl group, etc.

In constituting liquid crystal compositions, it is possible to constitute them from the compounds of the formula (I), alone, and it is also possible to constitute liquid crystal compositions exhibiting Sc* phase in admixture of other smectic liquid crystals with the compounds of the formula (I).

When the light-switching effect of Sc* phase is applied to display elements, there are three superior specific features as compared with TN display mode. The first specific feature is that the response is made at a very high rate and the response time is 1/100 or shorter than that of the elements of usual TN display mode. The second specific feature is that there is a memory effect and the multiplex drive is easy in cooperation with the above high rate response property. The third specific feature is that when the gray scale is made according to TN display mode, this is carried out by adjusting the impressed voltage, but there are difficult problems such as temperature-dependency of the threshold voltage, voltage-dependency of the response rate, etc.; whereas when the light-switching effect of Sc* phase is applied, it is possible to easily obtain the scale by adjusting the reverse time of the polarity; hence the above application is very suitable to graphic displays.

As for the display method, the following two modes may be considered: one, a birefringence type using two polarizers and the other, a guest-host type using a dichroic dyestuff. Sc* phase has a spontaneous polarization; hence when the polarity of the impressed voltage is reversed, the molecule reverses around its helical axis as a rotating axis. When a liquid crystal composition having Sc* phase is filld in a liquid crystal display cell subject to an aligning treatment so that liquid crystal molecules may align in parallel to the electrode surfaces; the liquid crystal cell is placed between two polarizers arranged so that the director of the liquid crystal molecules may be in parallel to the other polarization plane; a voltage is impressed; and the polarity is reversed, then it is possible to obtain bright visual field and dark one (determined by the opposed angle of the polarizers). On the other hand, when the cell is operated using the guest-host type, it is possible to obtain bright visual field and dark one (determined by the arrangement of the polarization plate), by reversing the polarity of the impressed voltage.

In general, it is difficult to align liquid crystal molecules in smectic state in parallel to the glass wall surface; hence liquid crystal molecules have so far been aligned by very slowly cooling its isotropic liquid in a magnetic field of several tens kilogausses or more (1° C.~2° C./hr). Whereas, in the case of liquid crystal substances having cholesteric phase, it is possible to easily obtain a uniformly aligned monodomain state, by cooling the substances at a cooling rate of 1° C./min. while impressing a direct current voltage of 50 V~100 V in place of the magnetic field.

As for racemic form compounds corresponding to the compounds of the formula (I), when racemic form alcohols corresponding to optically active alcohols are used as raw material in place of the latter in the preparation of optically active compounds of the formula (I) as described below, the racemic form compounds are similarly prepared, and exhibit nearly the same phase transition points as those of the compounds of the formula (I). Such racemic form compounds exhibit Sc phase in place of Sc* phase, and when they are added to the optically active compounds of the furmula (I), it is possible to use them for adjusting the pitch of chiral smectic phase.

Since the compounds of the formula (I) have an optically active carbon atom, when they are added to nematic liquid crystals, they ahve a capability of inducing a twisted structure. Nematic liquid crystals having a twisted structure i.e. chiral nematic liquid crystals do not form the so-called reverse domain of TN type display elements; hence it is possible to use the compounds of the formula (I) as an agent for preventing reverse domain from forming.

Preparation of Compounds

Next, preparation of compounds of the formula (I) will be described. First, the compounds of the formula (Ia) may be prepared according to the following steps:

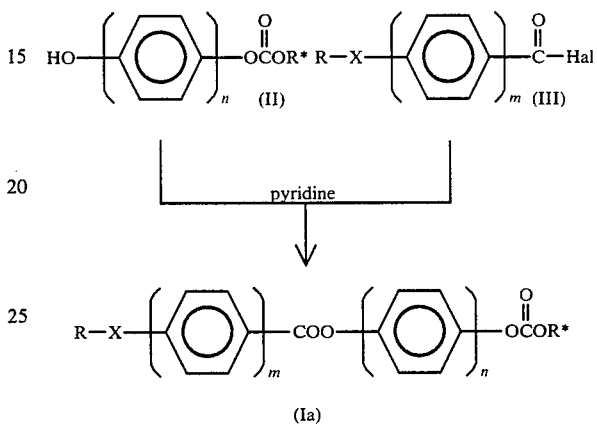

In this figure, R, R*, X, m and n are as defined above and Hal represents a halogen atom; this applies to the same symbols described hereinafter.

Namely, the compounds are prepared by reacting a phenol expressed by the formula (II) with a carboxylic acid halide expressed by the formula (III) in a basic solvent such as pyridine.

Phenols (II) are classified into the following types depending on the number of n:

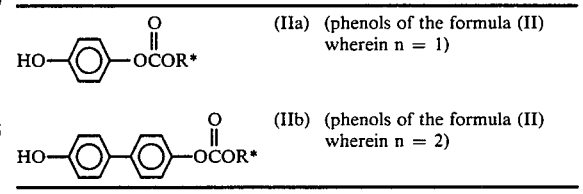

The optically active p-alkyloxycarbonyloxyphenols of the formula (IIa) may be suitably prepared according to the following steps:

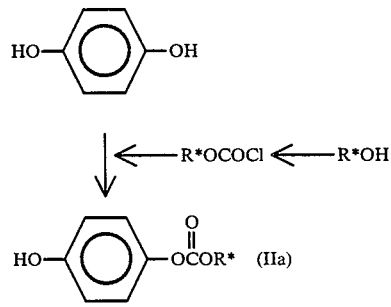

Namely, the compounds of (IIa) are obtained by monoesterifying hydroquinone with an alkyl chloroformate derived from an optically active alcohol in a basic solvent.

Further the optically active 4'-alkyloxycarbonyloxy-4-biphenols of the formula (IIb) may be suitably prepared according to the following steps:

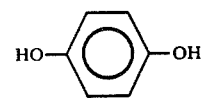

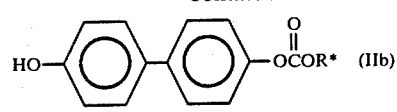

Namely, compounds of (IIb) are prepared by subjecting p,p'-biphenol to monocarbonic acid-esterification with an alkyl chloroformate derived from an optically active alcohol in a basic solvent.

Further, aromatic carboxylic acid halides as a counterpart raw material are classified into the following depending on m and x;

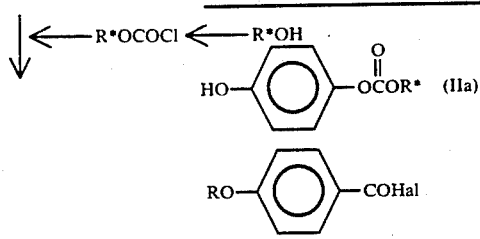

| | |
|---|---|
| 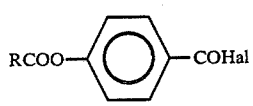 | (IIIa) (Compounds of formula (III) wherein m = 1 and X = single bond) |
| 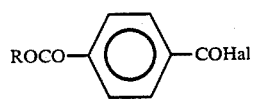 | (IIIb) (Compounds of formula (III) wherein m = 1 and X = —O—) |
| 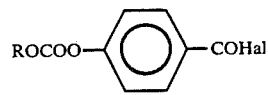 | (IIIc) (Compounds of formula (III) wherein m = 1 and X = —COO—) |
| 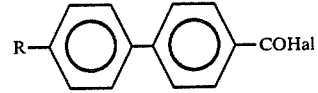 | (IIId) (Compounds of formula (III) wherein m = 1 and X = —OCO—) |
| 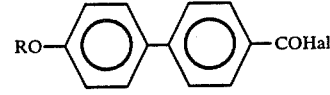 | (IIIe) (Compounds of formula (III) wherein m = 1 and X = —OCOO—) |
|  | (IIIf) (Compounds of formula (III) wherein m = 2 and X = single bond) |
| 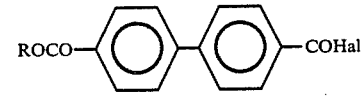 | (IIIg) (Compounds of formula (III) wherein m = 2 and x = —O—) |
| 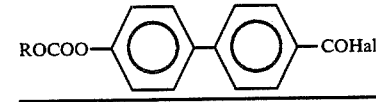 | (IIIh) (Compounds of formula (III) wherein m = 2 and X = —COO—) |
| 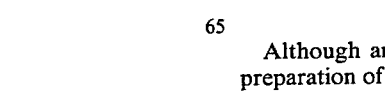 | (IIIi) (Compounds of formula (III) wherein m = 2 and X = —OCO—) |
| | (IIIj) (Compounds of formula (III) wherein m = 2 and X = —OCOO—) |

Although any of the above compounds are known, preparation of some of them will be described in Examples.

Next, preparation of compounds of the formula (Ib) will be described.

Compounds of the formula (Ib) wherein m=1 or 2 and n=1 (hereinafter abbreviated to (Ic)) may be prepared according to the following steps:

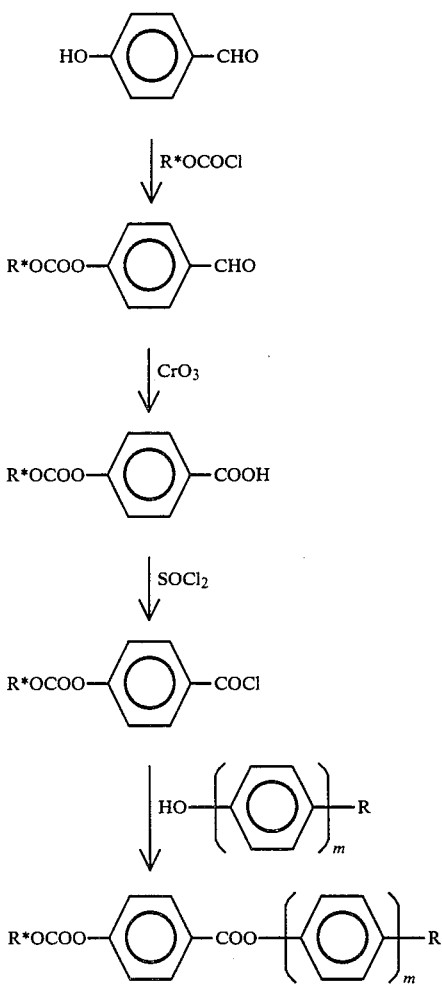

Namely, p-hydroxybenzaldehyde (IV) as a known substance is reacted with a S-alkyl chloroformate in the presence of pyridine to obtain a compound (V), which is then oxidized with an oxidizing agent such as anhydrous chromic acid in acetic acid solvent to obtain a compound (VI), which is then reacted with thionyl chloride to obtain a compound (VII), which is then reacted in the presence of pyridine with phenols of formula (VIII) corresponding to the final objective compounds (p-alkylphenols, p-alkoxyphenols, p-hydroxy-p'-alkylbiphenyls, p-hydroxy-p'-alkoxybiphenyls, etc.) to obtain the objective compounds (Ic).

Next, compounds of the formula (Ib) wherein m=1 or 2 and n=2 (hereinafter abbreviated to (Id)) may be prepared according to the following steps:

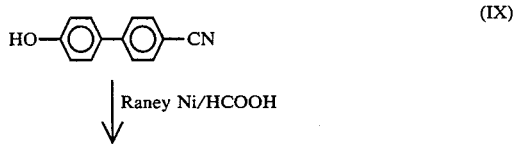

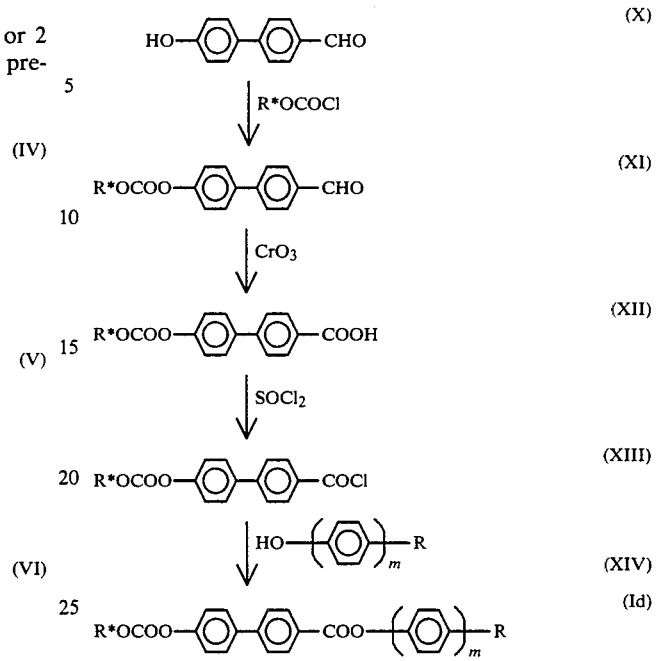

Namely, p-hydroxy-p'-cyanobiphenyl (IX) is converted into a compound (X) with a catalyst such as formic acid and Raney Ni to obtain a compound (X). This compound (X) is then reacted with a S-alkyl chloroformate in the presence of pyridine, to obtain a compound (XI), which is oxidized with an oxidizing agent such as anhydrous chromic acid in acetic acid solvent to obtain a compound (XII), which is then reacted with thionyl chloride to obtain a compound (XIII), which is then reacted in the presence of pyridine with phenols of the formula (XIV) corresponding to the final objective compounds (p-alkylphenols, p-alkoxyphenols, p-hydroxy-p'-alkylbiphenyls, p-hydroxy-p'-alkyloxybiphenyls, etc.) to obtain the objective compounds (Id).

The liquid crystal compounds and the liquid crystal compositions of the present invention will be described in more detail by way of examples.

EXAMPLE 1

Preparation of 4'-(2-methylbutyloxycarbonyloxy)-4-biphenyl-4-octyloxycarbonyloxybenzoate (a compound of the formula (Ia) wherein R=$C_8H_{17}$, R*=2-methylbutyl group, m=1, n=2 and X=—OCOO—)

(i) Preparation of 4-hydroxy-4'-(2-methylbutyloxycarbonyloxy)biphenyl (IIb)

Commercially available, p,p'-biphenol (37 g) was dissolved in pyridine (50 ml) and cooled with ice, followed by dropwise adding commercially available optically active 2-methylbutyl chloroformate (derived from S-(—)-2-methylbutanol) (15 g) to the solution, heating the mixture of a water bath at 60° C. for 2 hours, adding toluene (300 ml), transferring the mixture into a separating funnel, washing with water, and further washing with 6N-hydrochloric acid to deposit solids, which were then filtered by suction, followed by washing the filtrate with water to make the liquid neutral, filtering the solids on heating with toluene (200 ml), combining the filtrate and the above solution and concentrating these solutions.

Remaining solids are of unreacted raw material, p,p'-biphenol. Since the concentrated solution contained a monosubstituted compound and a disubstituted compound in admixture, these were separated according to column chromatography. The initial effluent was concentrated and recrystallized from ethanol to obtain 4,4'-bis(2-methylbutyloxycarbonyloxy)biphenyl (m.p. 85.5°~86.2° C.) (4.6 g). The second effluent was concentrated and recrystallized from toluene to obtain 4-hydroxy-4'-(2-methylbutyloxycarbonyloxy)biphenyl (m.p. 128.7°~130.2° C.) (11.1 g).

(ii) Preparation of p-octyloxycarbonyloxybenzoyl chloride

Commercially available p-hydroxybenzaldehyde (50 g) was dissolved in pyridine (400 ml), followed by dropwise adding octyl chloroformate (85 g) under ice cooling, heating on a water bath, allowing to stand overnight, adding toluene (300 ml), further adding 6N-hydrochloric acid, separating the liquid layer, further washing with 2N-NaOH aqueous solution, washing with water, drying, and distilling off toluene to obtain a raw product of p-octyloxycarbonyloxybenzaldehyde (75 g).

This product was dissolved in acetic acid (100 ml), followed by dropwise adding a mixed solution of chromium trioxide (30 g), water (40 ml) and acetic acid (60 ml), stirring at room temperature for 4 hours, pouring on ice, separating the resulting solids by filtering, dissolving the solids in ethanol (400 ml), further adding active carbon, shaking, filtering on heating, cooling with ice, separating crystals by filtering, and recrystallizing from ethanol (300 ml) to obtain p-octyloxycarbonyloxybenzoic acid (41 g). M.p.: 125.5° C.

This product (5 g) and thionyl chloride (7 g) were heated on a water bath at 60° C., followed by allowing to stand overnight, and distilling off excess thionyl chloride under reduced pressure to obtain p-octyloxycarbonyloxybenzoyl chloride (5 g). This product was used in the next step without purification.

(iii) Preparation of the captioned compound

4-Hydroxy-4'-(2-methylbutyloxycarbonyloxy)biphenyl (0.30 g) obtained in the above (i) was dissolved in pyridine (5 ml), followed by dropwise adding p-octyloxycarbonyloxybenzoyl chloride (0.33 g) obtained in the above (ii), under ice cooling, reacting the mixture on heating on a water bath at 60° C., adding toluene (50 ml), separating the toluene layer, washing with 6N-hydrochloric acid, then with 2N-NaOH aqueous solution, further with saturated NaCl aqueous solution to make the layer neutral, drying over sodium sulfate, concentrating, and twice recrystallizing from ethanol (30 ml) to obtain the objective 4-(2-methylbutyloxycarbonyloxy)-4-biphenyl-4-octyloxycarbonyloxybenzoate (0.42 g). This product was a liquid crystal exhibiting SB, Sc* and Ch phases and their phase transition points, C-Sc* point, Sc*-SB point, Sc*-Ch point and Ch-I point were 64.4° C., 55.2° C., 131.6° C. and 182.1° C., respectively. Further, its values of elemental analysis accorded well with its calculated values as follows:

|   | Observed values | Calculated values (in terms of $C_{34}H_{40}O_8$) |
|---|---|---|
| C | 70.6% | 70.81% |
| H | 7.1% | 6.99% |

EXAMPLE 2

Preparation of 4'-octyl-4-biphenylcarboxylic acid p-(2-methylbutoxycarbonyloxy)phenyl ester (a compound of the formula (Ia) wherein $R=C_8H_{17}$, $R^*$=2-methylbutyl group, X=single bond, m=2 and n=1)

(i) Preparation of p-(2-methylbutyloxy)phenol (IIa)

Commercially available hydroquinone (22.0 g) was dissolved in pyridine (100 ml) and cooled with ice, followed by dropwise adding 2-methylbutyl chloroformate (derived from 2-methylbutanol) (15.0 g), heating on a water bath at 60° C. for 2 hours, adding toluene (200 ml), separating the resulting organic layer, washing with 6N-hydrochloric acid, then with saturated NaCl aqueous solution to make the layer neutral, drying over sodium sulfate, concentrating, separating the soluble component according to gas chromatography, and concentrating the initial effluent to obtain oily hydroquinone-di-(2-methylbutyloxycarbonyl) (4.0 g). Further the second effluent was concentrated to obtain oily p-(2-methylbutyloxycarbonyloxy)phenol (12.3 g).

(ii) Preparation of the captioned compound p-(2-Methylbutyloxycarbonyloxy)phenol (0.25 g) prepared in the above (i) was dissolved in pyridine (5 ml) and cooled with ice, followed by dropwise adding a solution of 4'-octyl-4-biphenylcarboxylic acid chloride (0.37 g) dissolved in toluene (5 ml), heating on a water bath at 60° C., reacting the mixture, adding toluene (50 ml), separating the toluene layer, washing with 6N-hydrochloric acid, further with 2N-NaOH aqueous solution, then with a saturated NaCl aqueous solution to make the layer neutral, drying over sodium sulfate, concentrating, and twice recrystallizing from a mixed solution of ethyl acetate (20 ml) and ethanol (10 ml) to obtain the objective 4'-octyl-4-biphenylcarboxylic acid p-(2-methylbutyloxycarbonyloxy)phenyl ester. This product exhibited SA phase and Ch phase and its phase transition points, C-SA point, SA-Ch point, and Ch-I point were 78.3° C., 150.2° C. and 165.2° C., respectively. Further its values of elemental analysis accorded well with its calculated values as follows:

|   | Observed values | Calculated values (in terms of $C_{33}H_{40}O_5$) |
|---|---|---|
| C | 76.4% | 76.71% |
| H | 8.0% | 7.80% |

EXAMPLE 3

Preparation of
4-(2-methylbutyloxycarbonyloxy)phenyl-4-octanoyloxybenzoate (a compound of the formula (Ia) wherein $R=C_7H_{15}$, $R^*=2$-methylbutyl group, $m=n=1$ and $X=-COO-$)

(i) Preparation of p-octanoyloxybenzoyl chloride (IIIc)

Commercially available p-hydroxybenzaldehyde (50 g) was dissolved in pyridine (400 ml), followed by dropwise adding octanoyl chloride (80 g) under ice cooling, allowing to stand on a water bath overnight, adding toluene (300 ml), adding 6N-hydrochloric acid, separating the liquid layer, washing with 2N-NaOH aqueous solution, washing with water, drying, and distilling off toluene to obtain a raw product, distilling this product under reduced pressure to obtain p-octanoyloxybenzaldehyde (b.p. 176°~7° C./7 mmHg) (58.2 g), which was then dissolved in acetic acid (80 ml), followed by dropwise adding a mixed solution of chromium trioxide (23.4 g), water (25 ml) and acetic acid (48 ml), stirring at room temperature for 4 hours, pouring on ice, filtering the deposited solids, dissolving the solids in ethanol (300 ml), adding active carbon, shaking, filtering on heating, ice-cooling, separating the deposited crystals by filtering and recrystallizing from ethanol (300 ml) to obtain p-octanoyloxybenzoic acid (35 g). M.p. 51° C. This product (5 g) and oxalic acid chloride (7.2 g) were heated on a water bath at 60° C., followed by allowing to stand overnight, and distilling off excess oxalic acid chloride under reduced pressure to obtain p-octanoyloxybenzoyl chloride (5 g). This product was used in the following step without purification.

(ii) Preparation of the captioned compound p-(2-Methylbutyloxycarbonyloxy)phenol (0.25 g) prepared in the above (i) was dissolved in pyridine (5 ml), followed by dropwise adding p-octanoyloxybenzoyl chloride (0.32 g) prepared in the above (i), followed by the same procedure as in Example 1 (ii) to obtain the objective 4-(2-methylbutyloxycarbonyloxy)phenyl-4-octanoyloxybenzoate (0.30 g). This product exhibited SA phase and Ch phase, and its phase transition points, SA-Ch point, C-Ch point, and Ch-I point were 25.4° C., 49.0° C. and 58.2° C., respectively. Further its values of elemental analysis accorded well with its calculated values as follows:

|   | Observed values | Calculated values (in terms of $C_{26}H_{34}O_7$) |
|---|---|---|
| C | 68.0% | 68.10% |
| H | 7.6% | 7.47% |

EXAMPLE 4

Preparation of
S-(p-2-methylbutyloxycarbonyloxy)-benzoic acid-p-nonyloxy-p'-biphenylyl ester (a compound of the formula (Ib) wherein $m=2$, $n=1$, $R^*=2$-methylbutyl, and $R=C_9H_{19}O$; the compound of Table 2, No. 28)

p-Hydroxybenzaldehyde (16 g, 0.131 mol) was dissolved in dry pyridine (100 ml), followed by adding S-2-methylbutyl chloroformate (17.9 g, 0.119 mol), reacting the mixture, well stirring, allowing to stand overnight, adding toluene (100 ml) and water (100 ml), washing with 6N-hydrochloric acid, then with 2N-NaOH aqueous solution, further with water till the washing water became neutral, and distilling off toluene to obtain as a residue, a compound of (V) (27.5 g, 0.109 mol), which was then dissolved in acetic acid (77 ml), followed by stirring, dropwise dropping a solution of anhydrous chromic acid (21.8 g, 0.218 mol) dissolved in water (17 ml) and acetic acid (27 ml) while keeping the temperature of the system at 30° C. or lower, keeping the inner temperature at 40° C. on a water bath for 4 hours, cooling, adding water (300 ml), filtering the deposited crystals, washing with water and recrystallizing from ethanol to obtain a compound of (VI) (14.7 g). M.p. 176°~179° C.

Thionyl chloride (13 g, 0.108 mol) was added to the above compound of (VI) (14.7 g, 0.058 mol), followed by heating under reflux for one hour and distilling off excess thionyl chloride to obtain a compound of (VII) (15.0 g).

p-Hydroxy-p'-nonyloxybiphenyl (1.5 g, 0.005 mol) was dissolved in pyridine (5 ml), followed by adding the compound of (VII) (0.9 g, 0.003 mol), reacting the mixture, well stirring, allowing to stand overnight, adding toluene (50 ml) and water (50 ml), extracting the mixture with stirring, transferring into a separating funnel, washing the organic layer with 6N-hydrochloric acid, then with 2N-NaOH aqueous solution, further with water till the washing liquid became neutral, distilling off toluene and recrystallizing the residue from ethanol to obtain the objective S-(p-2-methylbutyloxycarbonyloxy)benzoic acid-p-nonyloxy-p'-biphenylyl ester (0.8 g). This product is a smectic and cholesteric liquid crystal, and its C-Sc* point, Sc*-Ch point and Ch-I point were 102.8° C., 139.8° C. and 170.4° C., respectively. Further, its values of elemental analysis accorded well with its analytical values as follows:

|   | Observed values | Calculated values (in terms of $C_{34}H_{42}O_6$) |
|---|---|---|
| C | 74.3% | 74.69% |
| H | 7.4% | 7.75% |

Procedure was carried out as in Example 4 except that p-hydroxy-p'-nonyloxybiphenyl was replaced by various kinds of p-hydroxy-p'-alkylbiphenyls or p-hydroxy-p'-alkyloxybiphenyls to obtain compounds of formula (Ib), Nos. 25~27 and 29 shown in Table 2. Their phase transition points are shown in Table 2.

EXAMPLE 5

Preparation of
S-(p-2-methylbutyloxycarbonyloxy)-p'-biphenylcarboxylic acid-p-nonyloxyphenyl ester (a compound of formula (Ib) wherein $m=1$, $n=2$, $R^*=2$-methylbutyl and $R=C_9H_{19}O$; the compound of Table 2, No. 36)

p-Hydroxy-p'-cyanobiphenyl compound (IX) (83.4 g, 0.427 mol), Raney Ni (79 g), formic acid (825 ml) and water (275 ml) were placed in a vessel, followed by heating under reflux for 4 hours with stirring, cooling, separating crystals by filtering, dissolving the crystals in ethanol (1.5 l), filtering on heating, distilling off ethanol, recrystallizing the residue from toluene (500 ml) and ethanol (50 ml), separating crystals by filtering and drying to obtain a compound (X) (40.8 g) having a m.p. of 177.8°~178.9° C.

This compound (X) (19.8 g, 0.100 mol) was dissolved in dry pyridine (100 ml), followed by adding to the solution, S-2-methylbutyl chloroformate (13.6 g, 0.090 mol), reacting the mixture, well stirring, allowing to stand overnight, adding toluene (100 ml) and water (100 ml), washing with 6N-hydrochloric acid, then with 2N-NaOH aqueous solution, further with water till the washing water became neutral, and distilling off toluene to obtain a compound (XI) (20.3 g) as a residue.

This compound (XI) (20 g, 0.064 mol) was dissolved in acetic acid (60 ml), followed by dropwise adding to the solution with stirring, a solution of anhydrous chromic acid (12.8 g, 0.128 mol) dissolved in water (10 ml) and acetic acid (16 ml) while keeping the temperature of the system at 30° C. or lower, keeping the inner temperature at 40° C. on a water bath for 4 hours, cooling, adding water (300 ml), filtering deposited crystals, washing the crystals with water, and recrystallizing the crystals from ethanol (400 ml) to obtain a compound (XII) (12.5 g), having as melting points, a C-Ch point of 230.6° C. and a Ch-I point of 250.8° C.

Thionyl chloride (9 g, 0.075 mol) was added to the compound (XII) (10 g, 0.030 mol), followed by refluxing for one hour, and distilling off excess thionyl chloride to obtain a compound (XIII) (9.2 g).

p-Nonyloxyphenol (1.2 g, 0.005 mol) was added to a solution of the compound (XIII) (1.5 g, 0.004 mol) dissolved in pyridine (5 ml) and the mixture was reacted, followed by well stirring, allowing to stand overnight, adding toluene (50 ml) and water (50 ml), extracting with stirring, transferring to a separating funnel, washing the resulting organic layer with 6N-hydrochloric acid, then with 2N-NaOH aqueous solution, further with water till the washing liquid became neutral, distilling off toluene and recrystallizing the residue from ethanol to obtain the objective S-(p-2-methylbutyloxycarbonyloxy)-p'-biphenylcarboxylic acid p-nonyloxyphenyl ester (0.9 g). This product is a smectic and cholesteric liquid crystal, and its C-Sc* point, Sc*-Ch point and Ch-I point were 82.1° C., 149.4° C. and 175.0° C., respectively. Further its values of elemental analysis accorded well with its calculated values as follows:

|   | Observed values | Calculated values (in terms of $C_{34}H_{42}O_6$) |
|---|---|---|
| C | 74.2% | 74.69% |
| H | 7.5% | 7.75% |

Procedure was carried out as in Example 6 except that p-nonyloxyphenol was replaced by various kinds of p-alkylphenols or p-alkoxyphenols, to prepare compounds of formula (Ib), Nos. 30~35 shown in Table 2. Their phase transition points are shown in Table 2.

EXAMPLE 6 (USE EXAMPLE 1)

A nematic liquid crystal composition consisting of

| 4-ethyl-4'-cyanobiphenyl | 20% by weight, |
| 4-pentyl-4'-cyanobiphenyl | 40% by weight, |
| 4-octyloxy-4'-cyanobiphenyl | 25% by weight, and |
| 4-pentyl-4'-cyanoterphenyl | 15% by weight, | was filled in a cell provided with transparent electrodes (distance between electrodes: 10 μm) having polyvinyl alcohol (PVA) as an agent for aligning treatment applied thereonto and subjected to aligning treatment by rubbing the surface, to prepare a TN type display cell, which was then observed under a polarization microscope. As a result, formation of a reverse domain was observed.

To the above nematic liquid crystal composition was added a compound of the formula (Ia) wherein m=2, n=1, X=—O—, R=$C_8H_{17}$ and R*=2-methylbutyl group (No. 24) in 1% by weight, and a TN cell was similarly prepared using the resulting composition and observed. As a result, the reverse domain was dissolved and a uniform nematic phase was observed.

EXAMPLE 7 (USE EXAMPLE 2)

A mixture of compounds of the formula (Ia), consisting of a compound of m=1, n=2, X=single bond, R=$C_5H_{11}$ and R*=2-methylbutyl group in the formula (Ia) (No. 7), a compound of m=1, n=2, X=—O—, R=$C_4H_9$ and R*=2-methylbutyl group (No. 11), a compound of m=1, n=2, X=—O—, R=$C_7H_{15}$ and R*=2-methylbutyl group (No. 14) and a compound of m=1, n=2, X=—O—, R=$C_8H_{17}$ and R*=2-methylbutyl group (No. 15), all in equal amounts, exhibits Sc* phase up to 112° C., exhibits Ch phase at temperatures exceeding 112° C. and becomes an isotropic liquid phase at 187° C.

The above mixture was filled in a cell provided with transparent electrodes having PVA as an agent for aligning treatment applied thereonto and subjected to parallel aligning treatment by rubbing the surface. The resulting liquid crystal cell was placed between two pieces of a polarizer arranged in a crossed Nicol state, and an alternating current of low frequency of 0.5 Hz and 15 V was impressed. As a result a clear switching operation was observed, and a liquid crystal display element exhibiting a very good contrast and having a response rate as high as 1 m.sec. was obtained.

EXAMPLE 8 (USE EXAMPLE 3)

A mixture of compounds of the formula (Ia), consisting of a compound of m=1, n=2, X=—O—, R=$C_5H_{11}$ and R*=2-methylbutyl group in the formula (Ia) (No. 12), a compound of m=1, n=2, X=—O—, R=$C_7H_{15}$ and R*=2-methylbutyl group (No. 14), a compound of m=1, n=2, X=—O—, R=$C_8H_{17}$ and R*=2-methylbutyl group (No. 15) and a compound of m=1, n=2, X=—OCO—, R=$C_8H_{17}$ and R*=2-methylbutyl group (No. 19), all in equal amounts, exhibits Sc* phase from 60° C. up to 121° C., exhibits Ch phase at temperatures exceeding 121° C. and becomes an isotropic liquid phase at 186° C.

To the mixture was added an anthraquinone dyestuff D-16 (made by BDH company) in 3% by weight to prepare the so-called guest-host type composition, which was filled in a cell same as in Example 7. One piece of a polarizer was arranged so that the polarization plane might be perpendicular to the molecular axis and an alternating current of low frequency of 0.5 Hz and 15 V was impressed. As a result, a clear switching operation was observed, and a color liquid crystal display element exhibiting a very good contrast and having a response rate as high as 1.5 m.sec was obtained.

EXAMPLE 9 (USE EXAMPLE 4)

The same nematic liquid crystal composition as in Example 6 and the same TN type display as in Example 6 were prepared. Formation of a reverse domain was similarly observed.

To the above nematic liquid crystal composition was added a compound of the formula (Ib) wherein m=2, n=1, R=$C_7H_{15}$ and R*=2-methylbutyl group (the compound of No. 25) in 0.1% by weight. A TN cell was similarly prepared using the resulting composition and observed. The reverse domain was dissolved and a uniform nematic phase was observed.

EXAMPLE 10 (USE 5)

A mixture consisting of a compound expressed by the formula

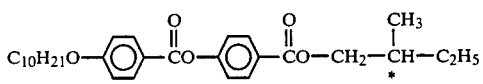

wherein * represents an optically active carbon atom (60% by weight), a compound of the formula (Ib) wherein m=2, n=1, R=C$_9$H$_{19}$O and R*=2-methylbutyl group (the compound of No. 28) (20% by weight) and a compound of the formula (Ib) wherein m=2, n=1, R=C$_{10}$H$_{21}$O and R*=2-methylbutyl group (the compound of No. 29) (20% by weight) exhibits Sc* phase up to 65° C., exhibits Ch phase at temperatures exceeding 65° C. and becomes an isotropic liquid at 100° C.

The above mixture was filled in a cell provided with transparent electrodes having PVA as an agent for aligning treatment applied thereonto and subjected to parallel aligning treatment, followed by gradually cooling the resulting cell from the isotropic liquid domain till Sc* phase was attained, while impressing a direct current voltage of 50 V to obtain a uniform monodomain cell. This liquid crystal cell was placed between two pieces of a polarizer arranged in a crossed Nicol stage to impress an alternating current of low frequency of 0.5 Hz and 15 V. As a result, a clear switching operation was observed and a liquid crystal display element exhibiting a very good contrast and having a high response rate (2 m.sec.) was obtained.

In addition, the value of the spontaneous polarization (Ps) of this liquid crystal composition was 2 nC/cm$^2$.

EXAMPLE 11 (USE EXAMPLE 6)

A mixture consisting of a compound expressed by the formula

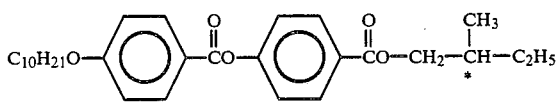

wherein * represents an optically active carbon atom, (60% by weight), a compound of the formula (Ib) wherein m=1, n=1, R=C$_6$H$_{13}$ and R*=2-methylbutyl group (No. 30) (20% by weight) and a compound of the formula (Ib) wherein m=1, n=1, R=C$_9$H$_{19}$O and R*=2-methylbutyl group (No. 35) (20% by weight), exhibits Sc* phase up to 70° C., exhibits Ch phase at temperatures exceeding 70° C. and becomes an isotropic liquid at 103° C.

To this mixture was added an anthraquinone dyestuff D-16 (made by BDH company) in 3% by weight to prepare the so-called guest-host type composition, which was filled in the same cell as in Example 10. One piece of a polarizer was arranged so that the polarization plane might be parallel to the molecular axis and an alternating current of low frequency of 0.5 Hz and 15 V was impressed. As a result, a clear switching operation was observed, and a color liquid crystal display element exhibiting a very good contrast and having a high response rate (2 m.sec.) was obtained.

In addition the value of spontaneous polarization of this liquid crystal composition was 3 nC/cm$^2$.

What we claim is:

1. A compound of the formula

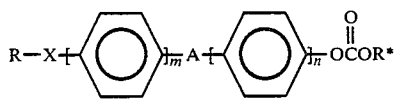

wherein R represents an alkyl group of 1 to 18 carbon atoms; R* represents an optically active alkyl group of 4 to 18 carbon atoms; X represents a single bond or —O—; A represents

and m and n each is 1 or 2 but m+n is 3.

2. A compound according to claim 1 wherein R* is 2-methylbutyl.

3. A compound according to claim 1 wherein X represents a single bond.

4. A chiral smectic liquid crystal composition having at least 2 components at least one of which is a compound set forth in claim 1.

5. A chiral smectic liquid crystal composition consisting of a plurality of the compounds as defined in claim 1.

* * * * *